United States Patent
Katukam

(10) Patent No.: US 7,542,414 B1
(45) Date of Patent: Jun. 2, 2009

(54) COMPUTING A DIVERSE PATH WHILE PROVIDING OPTIMAL USAGE OF LINE PROTECTED LINKS

(75) Inventor: Suresh Katukam, Rohnert Park, CA (US)

(73) Assignee: Cisco Technology, Inc., San Jose, CA (US)

( * ) Notice: Subject to any disclaimer, the term of this patent is extended or adjusted under 35 U.S.C. 154(b) by 855 days.

(21) Appl. No.: 10/698,700

(22) Filed: Oct. 31, 2003

(51) Int. Cl.
*G01R 31/08* (2006.01)
*G06F 11/00* (2006.01)

(52) U.S. Cl. .................. 370/223; 370/224; 370/225; 370/226; 370/227; 370/228

(58) Field of Classification Search ......... 370/223–228, 370/218, 235, 237, 238, 238.1, 255, 258, 370/352, 360, 363, 400
See application file for complete search history.

(56) References Cited

U.S. PATENT DOCUMENTS

| | | | |
|---|---|---|---|
| 5,253,248 A | 10/1993 | Dravida et al. ............. 370/16 |
| 5,467,345 A | 11/1995 | Cutler, Jr. et al. ............. 370/60 |
| 5,497,368 A | 3/1996 | Reijnierse et al. ............. 370/54 |
| 5,627,822 A | 5/1997 | Edmaier et al. ............. 370/218 |
| 5,854,899 A | 12/1998 | Callon et al. ........... 395/200.68 |
| 6,073,248 A * | 6/2000 | Doshi et al. ..................... 714/4 |
| 6,078,590 A | 6/2000 | Farinacci et al. ............. 370/432 |
| 6,185,210 B1 | 2/2001 | Troxel ......................... 370/395 |
| 6,690,644 B1 * | 2/2004 | Gorshe ........................ 370/219 |
| 6,744,769 B1 * | 6/2004 | Siu et al. ............... 370/395.32 |
| 6,813,242 B1 * | 11/2004 | Haskin et al. ............... 370/229 |
| 2002/0181485 A1 * | 12/2002 | Cao et al. ..................... 370/419 |
| 2002/0181490 A1 * | 12/2002 | Frannhagen et al. ........ 370/442 |
| 2004/0205239 A1 * | 10/2004 | Doshi et al. ................. 709/241 |

* cited by examiner

*Primary Examiner*—Chi H Pham
*Assistant Examiner*—Farah Faroul
(74) *Attorney, Agent, or Firm*—Edell, Shapiro & Finnan, LLC

(57) ABSTRACT

Methods and apparatus for enabling line-protected links to be included in path-protected segments of a unidirectional path-switched ring are disclosed. According to one aspect of the present invention, a method for computing a circuit path that includes a primary path between a start node and a destination node as well as an alternate path includes determining the primary path using a routing algorithm. The primary path includes a protectable segment which has a first line-protected link. The method also includes creating the alternate path using the routing algorithm. Creating the alternate path includes creating the alternate path between the start node and the end node with the alternate path arranged to protect at least the protectable segment which includes the first line-protected link. In one embodiment, the alternate path is created including the first line-protected link.

27 Claims, 7 Drawing Sheets

COMPUTING A DIVERSE PATH WHILE PROVIDING OPTIMAL USAGE OF LINE PROTECTED LINKS

BACKGROUND OF THE INVENTION

1. Field of Invention

The present invention relates generally to data communication systems. More particularly, the present invention relates to systems and methods for enabling path-protected segments of a circuit to include line-protected links.

2. Description of the Related Art

The demand for data communication services is growing at an explosive rate. Much of the increased demand is due to the fact that more residential and business computer users are becoming connected to the Internet. Furthermore, the types of traffic being carried by the Internet are shifting from lower bandwidth applications towards high bandwidth applications which include voice traffic and video traffic.

To address the demand for data communication services, the use of optical networks, such as a synchronous optical network (SONET) is becoming more prevalent. One type of SONET network, or one type of network that is subject to SONET standards, is a time division multiple access (TDM) network. TDM networks generally allocate single channels or lines to be used amongst multiple users, or customers of data communication services. The single channels may each be divided into slots of time during which each user has access to the single channels. Many TDM networks may be configured to include a path protected mesh network (PPMN). A PPMN is a mesh of unprotected links with substantially no physical topological constraint. One example of a PPMN is a unidirectional path-switched ring (UPSR), which is effectively a PPMN with a ring-like topology. A UPSR or a virtual UPSR in a PPMN, as will be appreciated by those skilled in the art, provides for two different paths between a source and a destination. The source and the destination each select traffic from one of the paths based upon, for example, signal presence and signal quality.

Although a network such as a TDM network is generally designed to ensure that information may be transferred within the network reliably, there are times where network components may fail. Failures of network components may cause received signals to have a relatively high bit-error rate or, in some cases, cause a signal to be completely lost. In SONET, mechanical failures and equipment failures may occur. Mechanical failures include the effects of vibrations which affect optical connections, and bends in links or fibers which may result in degraded signal levels. Equipment failures may include, but are not limited to, failures of lasers which transmit optical signals, failures of links or channels over which signals are transmitted, and failures of nodes which are interconnected by links.

In order to compensate for link failures, links may be protected. A protected link is a link which has two fibers or cables over which signals may be transmitted substantially simultaneously. One example of a protected link is a link with "1+1" protection. Another example of a link with line protection is a bi-directional line switched ring (BLSR) link. A link with 1+1 protection, or a "1+1 link," is made up of two unprotected links, i.e., sub-links. When an optical signal is to be transferred across a 1+1 link from a source node to a destination node, the optical signal is transferred across both sub-links of the 1+1 link. That is, the optical signal is transferred redundantly across both sub-links. The use of two sub-links within a 1+1 link enables a choice to be made regarding which optical signal received on the destination node is to be accepted by the destination node. Typically, the signal with the lower bit-error rate is accepted.

Some links between nodes are unprotected as it is generally less expensive to transfer signals across an unprotected link than it is to transfer signals across a protected link. While an unprotected link typically enables data to be transferred successfully, if a particular unprotected link between two nodes fails, then there is no alternate link over which data may be transferred between the two nodes.

In general, nodes may have many links therebetween. FIG. 1 is a diagrammatic representation of nodes in a TDM network that are connected by links which include links with 1+1 protection and unprotected links in a mixed protection domain. Within a network 100, nodes 102 are substantially interconnected with links 106. Links 106a, 106b are protected links which have 1+1 protection, while links 106c-i are unprotected links. As discussed above, protected links 106a, 106b may each include two unprotected sub-links. Since protected links 106a, 106b have 1+1 protection, if one of the sub-links in either of protected links 106a, 106b fails, a signal being carried on protected links 106a, 106b may still be transmitted over the sub-link associated with the failed sub-link.

When node 102a is an overall source node, and node 102d is an overall destination node, a customer may specify to a network administrator whether he prefers a protected path or an unprotected path between nodes 102a and 102d. When a customer specifies a protected path or a protected circuit between nodes 102a and 102d, a primary path 204 between nodes 102a and 102d may be defined to include 1+1 links 106a and 106b, and link 106c, as shown in FIG. 2. When primary path 204 is defined between nodes 102a, 102d, the segment which includes 1+1 links 106a and 106b, i.e., the segment between node 102a and node 102c, is substantially automatically protected. However, the segment between node 102c and node 102d is an unprotected segment as it includes unprotected link 106c. Hence, in order for an overall protected path to be defined between nodes 102a and 102d, a segment which is suitable for protecting the segment between nodes 102c and 102d that includes unprotected link 106c must be found.

A segment between nodes 102c and 102d which is suitable for protecting the segment that includes unprotected link 106c includes unprotected links 106d-h, and passes through nodes 102e-h. Therefore, primary path 204 is effectively protected by an alternate path 208 which begins at node 102a and includes links 106d-h.

Although the shortest, lowest cost path from node 102a to node 102d would utilize single unprotected link 106i, such a path would not be usable, i.e., such a path may not be used as a part of a protected circuit. The cost associated with a path may generally depend upon at least one of factors such as the number of hops in a path, the distance traversed by the path, the length of fibers used in the path, and the administrative cost associated with the fibers in the path. The inability to use unprotected link 106i is due, at least in part, to the fact that 1+1 links 106a, 106b may not be used to protect unprotected link 106i. Since a UPSR may not utilize a segment which includes 1+1 links 106a, 106b to protect an unprotected path, the absolute shortest, lowest cost path between node 102a and node 102d may not be used to send traffic between node 102a and node 102d when a protected circuit is desired.

The inability to use the shortest available path to send traffic between a source node and a destination node often causes inefficiencies within a network, particularly when there is available bandwidth associated with the shortest available path. This is due to the fact that path protected segments of protected circuits may not contain line-protected links, and the fact that segments of an alternate path which protects a primary path also may not include segments which include line-protected links.

Therefore, what is needed is an efficient method and apparatus for allowing an option for line-protected links, e.g., links which have 1+1 protection, to be included in path-protected segments of a protected circuit. That is, what is desired is an efficient and accurate system which enables an end-to-end path between a source and a destination to be substantially optimized while enabling line-protected links to be included in path-protected segments of a protected circuit if an operator chooses to enable the option of using line-protected links.

SUMMARY OF THE INVENTION

The present invention relates to enabling line-protected links to be included in path-protected segments of a unidirectional path-switched ring. According to one aspect of the present invention, a method for computing a circuit path that includes a primary path between a start node and a destination node as well as an alternate path includes determining the primary path using a routing algorithm. The primary path includes a protectable segment which has a first line-protected link. The method also includes creating the alternate path using the routing algorithm. Creating the alternate path includes creating the alternate path between the start node and the end node such that the alternate path is arranged to protect at least the protectable segment which includes the first line-protected link. In one embodiment, the alternate path is created such that the alternate path includes the first line-protected link.

The ability to enable a protectable segment which includes a line-protected link such as a link with 1+1 protection to be protected by an alternate path segment allows a substantially optimal overall circuit between a source and a destination to be computed. In the computation of an alternate path, the source and the destination of a primary path may be considered to be a source and a destination for the alternate path. By allowing an alternate path segment to protect a primary path segment which includes a link with 1+1 protection, a substantially optimal overall circuit path may be identified, since substantially every available link between a source and a destination may be considered for use in a primary path. Further, when a link with 1+1 protection is used in both a primary path and an alternate path of an overall circuit, since such a link is effectively reused by the alternate path, the costs associated with the overall circuit may be substantially optimized since the link is effectively included in the overall circuit only once.

According to another aspect of the present invention, a method for computing an overall circuit path within a network between a start node and a destination node includes determining a primary path segment to include at least one line-protected link between the start node and the destination node, and determining a corresponding alternate path segment to substantially start at the start node and end at the destination node. The alternate path segment protects the primary path segment that includes the line-protected link. In one embodiment, the alternate path segment also includes the line-protected link. In another embodiment, the overall circuit path is a unidirectional path-switched ring.

These and other advantages of the present invention will become apparent upon reading the following detailed descriptions and studying the various figures of the drawings.

BRIEF DESCRIPTION OF THE DRAWINGS

The invention may best be understood by reference to the following description taken in conjunction with the accompanying drawings in which.

DETAILED DESCRIPTION OF THE EMBODIMENTS

A network such as a time division multiple access (TDM) network that is subject to synchronous optical network (SONET) standards often is such that a unidirectional path-switched ring (UPSR) within a TDM network may not include line-protected links, as for example protected links with "1+1" protection. That is, protected links may not be included in path-protected segments of a circuit path that are associated with a UPSR or, more generally, a path protected mesh network (PPMN). The identification of a primary path and a corresponding alternate path of a protected circuit which avoids the use of protected links is often inefficient, as the lowest cost or shortest path between a source and a destination may include protected links. That is, the actual lowest cost or shortest path between a source and a destination often may not be used as a primary path between the source and the destination when the actual lowest cost or shortest path includes a path-protected segment which has line-protected links.

Allowing line-protected links to be included in path-protected segments of an overall protected path generally enables the path between a source and a destination to be substantially optimized. By way of example, when links with 1+1 protection, or "1+1 links," may be included in path-protected segments, if the shortest or lowest cost path between a source and a destination would include a 1+1 link, the shortest or lowest cost path may be chosen as a primary path. Hence, in general, the shortest or lowest cost available path within a network may be used to send data between a source and a destination. As such, the efficiency with which the network operates, and the performance of the network, may be enhanced.

In some networks, the ability to allow line-protected links to be included in a path-protected segment may be optional. That is, a network operator may be provided with code devices which allow line-protected links to be included in a path-protected segment, as well as the ability to enable or to disable the functionality associated with allowing line-protected links to be included in a path-protected segment. Hence, while an algorithm to allow line-protected links to be included in a path-protected segment is effectively available to the network operator, the network operator may choose not to allow line-protected links to be included in a path-protected segment if he or she desires.

Figure 1:
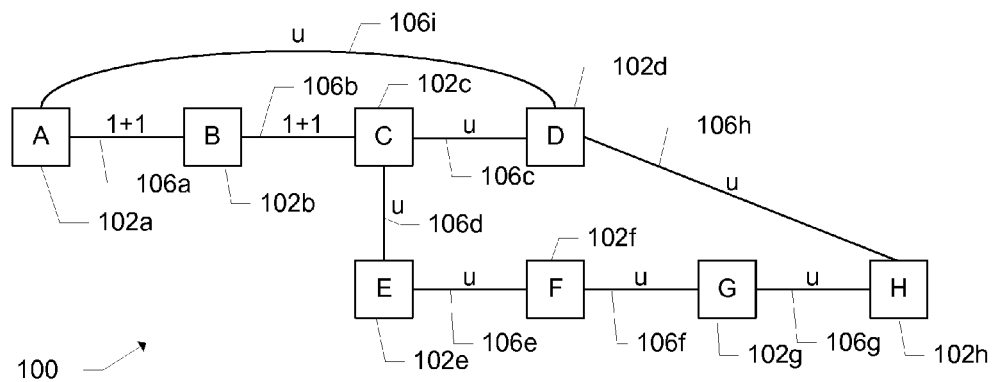
FIG. 1 is a diagrammatic representation of nodes in a TDM network that are connected by links which include links with 1+1 protection and unprotected links in a mixed protection domain.
Figure 2:
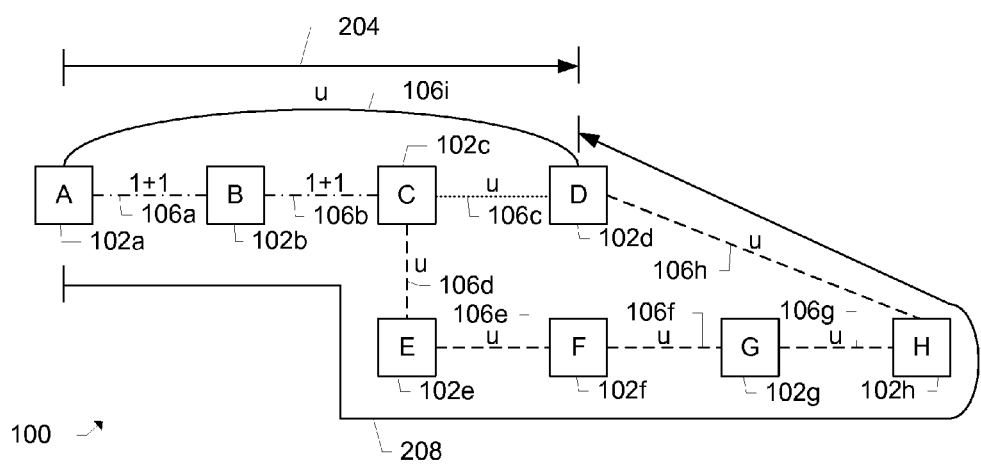
FIG. 2 is a diagrammatic representation of a protected circuit path in a network, i.e., network 100 of FIG. 1.
Figure 3:
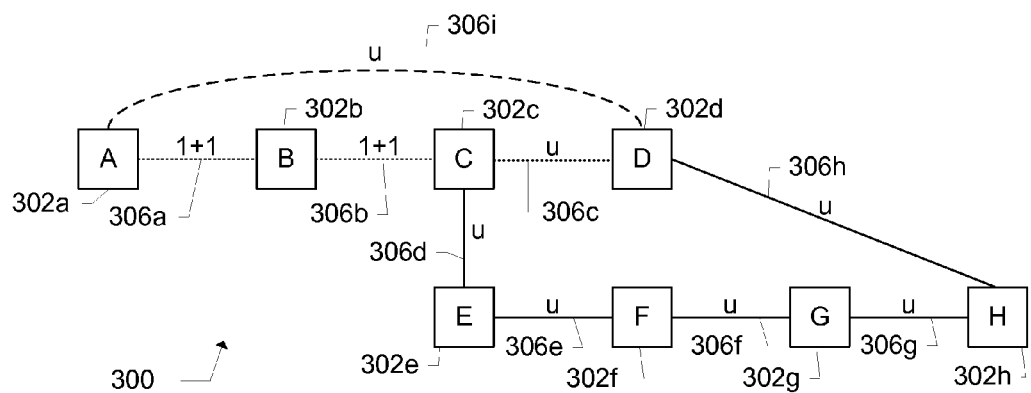
FIG. 3 is a diagrammatic representation of a network of nodes and links within which paths may be computed in accordance with an embodiment of the present invention.

FIG. 3 is a diagrammatic representation of a network of nodes and links within which paths may be computed in accordance with an embodiment of the present invention. A network 300, which may be a TDM network, includes nodes 302 and links 306. Links 306 include unprotected links 306c-i, and links 306a, 306b which have 1+1 protection. In the described embodiment, a primary circuit path is desired between a source node A 302a and a destination node D 302d. Typically, the primary circuit path, or the primary path in a protected circuit, may be the shortest path, e.g., the path including the fewest number of links, between node 302a and node 302d, as determined by a "shortest path first" algorithm. It should be appreciated, however, that the primary circuit path is not necessarily the shortest path between node 302a, and node 302d. For instance, when the computation of a primary circuit path accounts for load balancing, the computed primary circuit path may not be the shortest, or least-switched, path but may instead be the lowest cost path.

Generally, a primary circuit path may include both protected segments and unprotected segments. In other words, a primary circuit path may include a set of contiguous links that are protected, as well as a set of contiguous links that are unprotected. In addition, a primary circuit path may include unprotected links and have a corresponding alternate circuit path which also includes unprotected links. When considered together, the primary and alternate circuit paths provide a protected circuit path.

In the described embodiment, protected links 306a, 306b may be included in a protected segment of a primary path between node 302a and node 302d. Hence, a primary path may include 1+1 link 306a, 1+1 link 306b, and unprotected link 306c. While a primary path which includes substantially only unprotected link 306i may be shorter than a primary path which includes 1+1 link 306a, 1+1 link 306b, and unprotected link 306c, it may not be possible to find an alternate path, as for example an alternate path which does not include any protected links 306, which protects a primary path that includes substantially only unprotected link 306i.

Once a primary path which includes 1+1 link 306a, 1+1 link 306b, and unprotected link 306c is identified, an alternate path which serves to protect the primary path may be identified. The alternate path is computed such that node 302a is considered to be the source for the alternate path and node 302d is considered to be the destination of the alternate path. In determining an alternate path, the shortest path between node 302a and node 302d is first expanded, as will be appreciated by those skilled in the art. An alternate path that is chosen is the shortest path or the lowest cost path between node 302a and node 302d which has available bandwidth. In the described embodiment, the primary path which includes 1+1 link 306a, 1+1 link 306b, and unprotected link 306c is effectively a path-protectable segment which may be protected by an alternate path and includes at least one line-protected link.

When a 1+1 link such as 1+1 link 306a or 1+1 link 306b is included in a primary path, using the 1+1 link as a part of an alternate path which protects the primary path is preferable, since there is generally very little cost associated with substantially reusing the 1+1 link. Hence, an algorithm which is arranged to compute an alternate path which protects the primary path may take into account the relatively low cost associated with substantially reusing 1+1 links. One suitable algorithm which may be used to compute an alternate path may make such a computation based on constraints such as nodal and link diverse constraints, as described in co-pending U.S. patent application Ser. No. 09/909,049, filed Jul. 18, 2001, which is incorporated herein by reference in its entirety. Substantially reusing 1+1 links whenever possible may enable, in many cases, an effectively optimal overall circuit path to be determined since line-protected links may be included substantially only one time in the overall circuit path and be used in both a primary path and an alternate path.

Unprotected link 306i between node 302a and node 302d effectively comprises the shortest and lowest cost alternate path which protects the primary path which includes 1+1 link 306a, 1+1 link 306b, and unprotected link 306c. While the alternate path which includes unprotected link 306i does not reuse 1+1 link 306a or 1+1 link 306b, the alternate path includes a single unprotected link 306i while an alternate path which would reutilize link 306a and link 306b would include links 306a, 306b, and 306d-h. An alternate path which uses link 306i has fewer "hops," i.e., passes through fewer intermediate nodes, than an alternate path which reuses links 306a, 306b. Hence, the costs associated with the alternate path which includes unprotected link 306i is such that the alternate path is both the shortest and lowest cost available alternate path, i.e., the optimal path.

Figure 4:
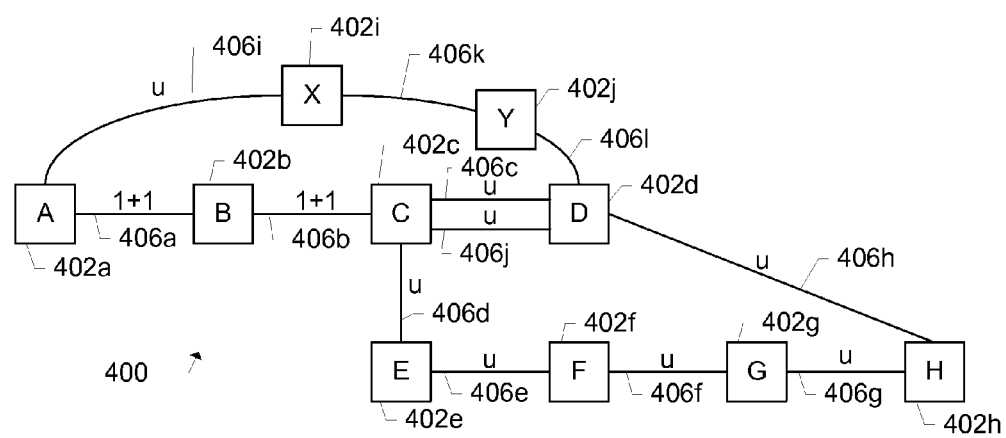
FIG. 4 is a diagrammatic representation of an overall circuit path which reuses line-protected links in primary and alternate paths in accordance with an embodiment of the present invention.

With reference to FIG. 4, an overall circuit path which reuses line-protected links in primary and alternate paths will be described in accordance with an embodiment of the present invention. A network 400 includes nodes 402 and links 406. Links 406 include 1+1 links 406a, 406b, and unprotected links 406c-l. Node 402c and node 402d are in communication across two unprotected links 406c, 406. When an overall circuit path is to be determined between a source node 402a and a destination node 402d, a primary path may include 1+1 link 406a, 1+1 link 406b, and unprotected link 406c. Once 1+1 link 406a and 1+1 link 406b are included in a primary path, the costs associated with also using 1+1 link 406a and 1+1 link 406b in a corresponding alternate path is relatively low.

In one embodiment, when a primary path includes 1+1 links 406a, 406b, then an algorithm which determines a corresponding alternate path substantially automatically prefers using 1+1 links 406a, 406b in the corresponding alternate path since the costs associated with reusing 1+1 links 406a, 406b is relatively low. It should be appreciated that an alternate path between node 402a and node 402d which includes unprotected links 406i-l passes through the same number of intermediate nodes 402 as the alternate path which reuses 1+1 links 406a, 406b. That is, an alternate path which includes unprotected links 406i, 406k, 406l is just as short as an alternate path which includes 1+1 link 406a, 1+1 link 406b, and unprotected link 406j. However, since the costs associated with reusing 1+1 links 406a, 406b is relatively low, the costs associated with an alternate path which includes 1+1 link 406a, 1+1 link 406b, and unprotected link 406j is generally lower than the costs associated with an alternate path which includes unprotected links 406i, 406k, 406l. Hence, an alternate path between node 402a and node 402d which includes 1+1 link 406a, 1+1 link 406b, and unprotected link 406j is an optimal alternate path which corresponds to a primary path between node 402a and node 402d which is effectively a path protected segment that includes line-protected links 406a, 406b, and unprotected link 406c.

Figure 5:
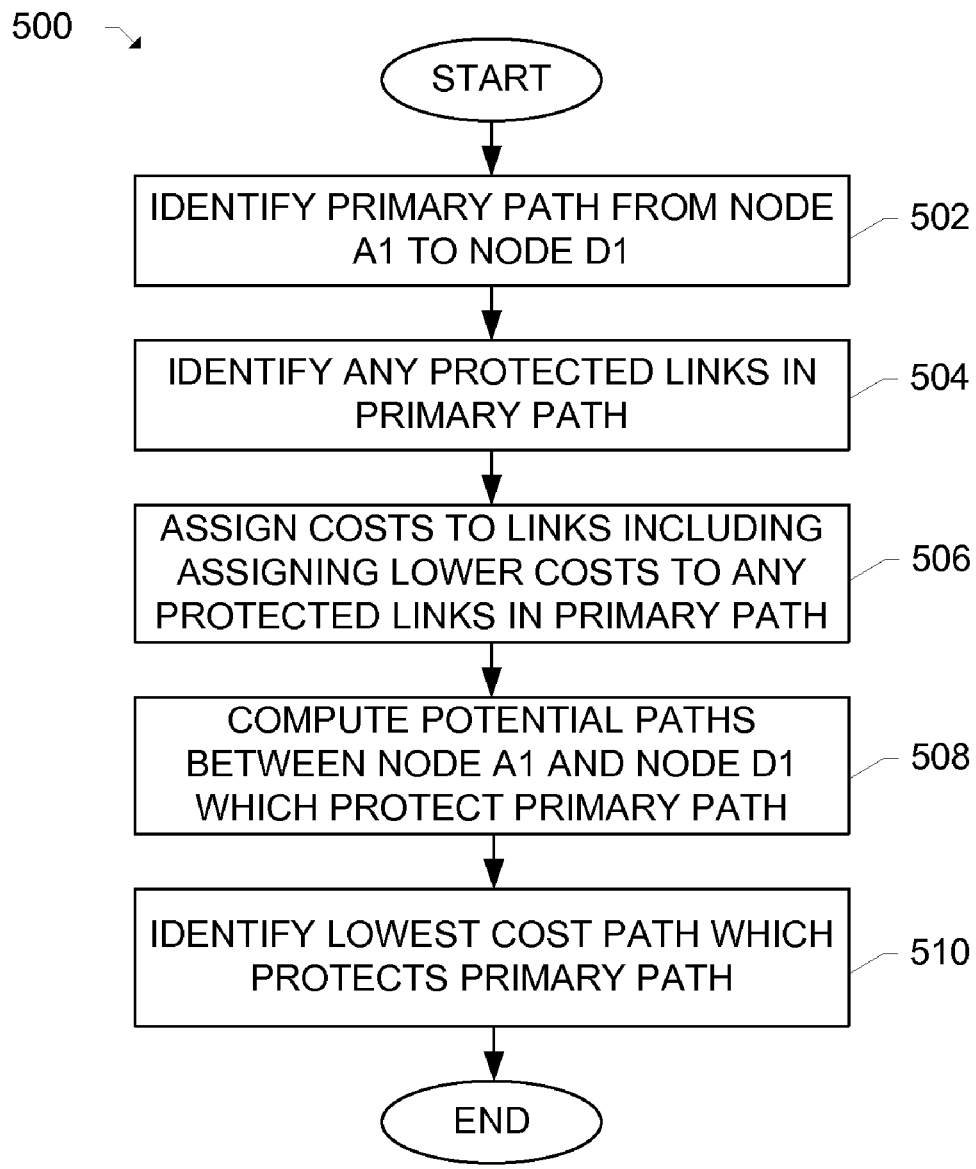
FIG. 5 is a process flow diagram which illustrates one method of creating an overall circuit path between a source node and a destination node which allows for the use of line-protected links in a path protected segment in accordance with an embodiment of the present invention.
Figure 6A:
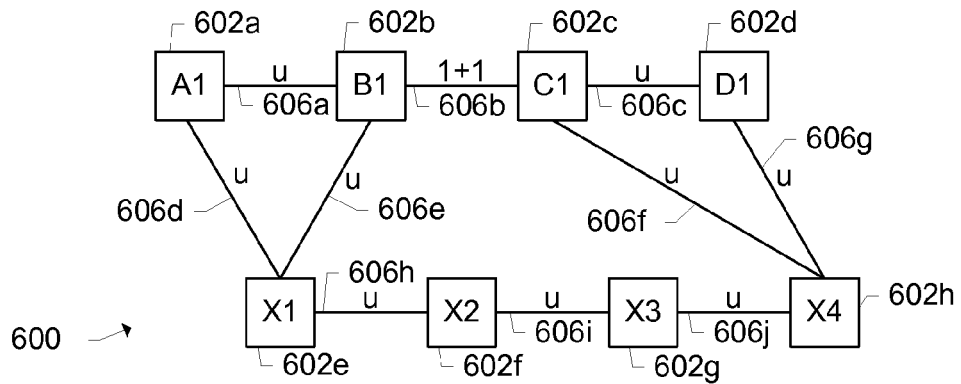
FIG. 6a is a diagrammatic representation of a network which includes nodes which are interconnected using both unprotected and protected links in accordance with an embodiment of the present invention.

Referring next to FIG. 5, one method of creating an overall circuit path between a source node and a destination node which allows for the use of line-protected links in a path protected segment will be described in accordance with an embodiment of the present invention. A process 500 of creating an overall circuit path such as a UPSR which allows the use of line-protected links in a path protected segment begins at step 502 in which a primary path from a source node, e.g., node A1 602a of FIG. 6a, and a destination node, e.g., node D1 602d of FIG. 6a, is identified. The primary path may be identified using substantially any routing algorithm or route generator, as for example a shortest path first algorithm, and may be executed using a processing unit that is associated with an overall network. Suitable algorithms include, but are not limited to, those described in co-pending U.S. patent application Ser. No. 09/872,177 (now U.S. Pat. No. 7,051,113 issued May 23, 2006), Ser. No. 09/872,141 (now U.S. Pat. No. 7,031,253 issued Apr. 18, 2006), Ser. No. 09/872,176 (now U.S. Pat. No. 6,975,588 issued Dec. 13, 2005), and Ser. No. 09/909,049 (pending), which are each incorporated herein by reference in their entireties. The processing unit may be a part of a computing device which is in communication with the overall network, or the processing unit may be implemented on a node within the network. When appropriate, the primary path may include path-protected segments which use line-protected links.

Although a primary path that has a corresponding alternate path is generally chosen to be the shortest between a source node and a destination node, the primary path may also account for load balancing, in which case the primary path may not be chosen to be the shortest, or least-switched, path between the source node and the destination node. One method of computing suitable primary paths is discussed in co-pending U.S. patent application Ser. No. 09/872,177, which has been incorporated by reference. Suitable primary paths may also be the lowest cost path, or the path which has the lightest load. It should be appreciated that the lowest cost path may sometimes be the shortest path, the path with the lightest load, the path with the fewest hops.

Once a primary path is identified, substantially any protected links in the primary path are identified in step 504. When a primary path between node A1 602a and node D1 602d in network 600 of FIG. 6a is identified as including links 606a-c, since link 606b is a 1+1 link, link 606b is identified as a protected link. In step 506, costs are assigned to substantially all links in a network with links having relatively low costs being assigned to any links identified in step 504 as being protected. The assignment of lower costs to protected links in the primary path often serves to promote the use of such protected links in the computation of a corresponding alternate path.

After costs are assigned to links in a network, potential alternate paths between a source node and a destination node which may be suitable for protecting a primary path between the source node and the destination node are computed in step 508. Suitable methods for computing alternate paths include, but are not limited to, methods described in co-pending U.S. patent application Ser. No. 09/872,141 (now U.S. Pat. No. 7,031,253 issued Apr. 18, 2006) and Ser. No. 09/909,049 (pending), which have been incorporated by reference. In step 510, the lowest cost path which protects the primary path is identified as the alternate path which is to protect the primary path. Once the alternate path is identified, the process of creating an overall circuit path is completed.

Figure 6B:
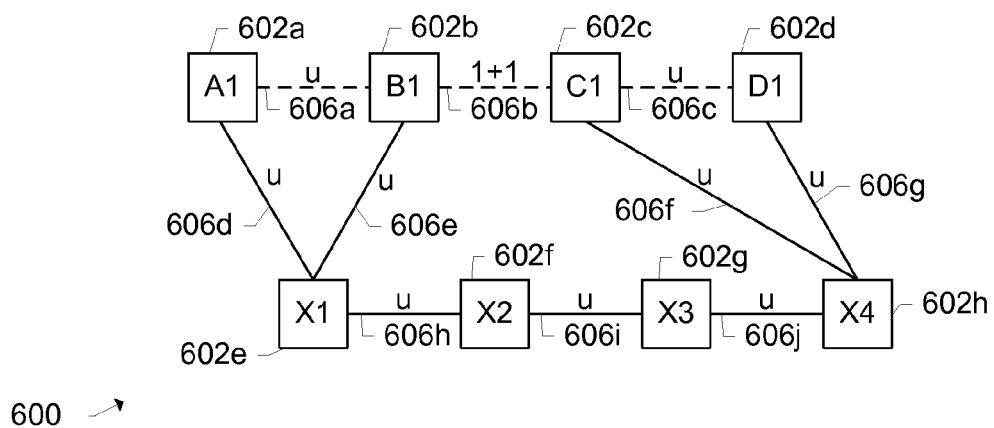
FIG. 6b is a diagrammatic representation of a network, i.e., network 600 of FIG. 6, in which a primary path of an overall circuit has been identified in accordance with an embodiment of the present invention.
Figure 6C:
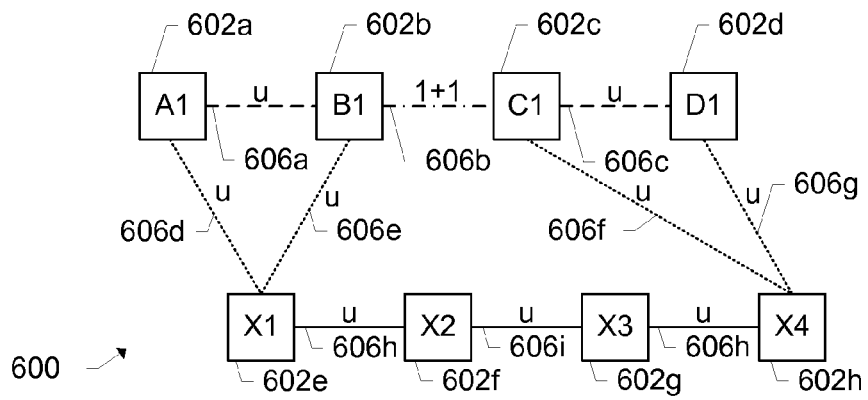
FIG. 6c is a diagrammatic representation of a network, i.e., network 600 of FIG. 6, in which a primary path and an alternate path of an overall circuit have been identified in accordance with an embodiment of the present invention.

With reference to FIGS. 6a-c, the determination of an overall circuit path will be described. FIG. 6a is a diagrammatic representation of a network which includes nodes which are interconnected using both unprotected and protected links in accordance with an embodiment of the present invention. A network 600 includes a source node 602a and a destination node 602d, as previously mentioned. Nodes 602 are interconnected through links 606 which include a 1+1 link 606b between intermediate nodes 602b, 602c. A primary path between node 602a and node 602d is defined to include unprotected link 606a, 1+1 link 606b, and unprotected link 606c, as shown in FIG. 6b.

Within network 600, there may be two potential alternate paths which are suitable for protecting the primary path between node 602a and node 602d that includes unprotected link 606a, 1+1 link 606b, and unprotected link 606c. One potential alternate path substantially bypasses 1+1 link 606b, and includes unprotected link 606d, unprotected links 606h-j, and unprotected link 606g. Such a potential alternate path includes five hops, and is switched five times.

Another potential alternate path uses 1+1 link 606b which, since it has already been used in the primary path between node 602a and node 606c, has a relatively low cost associated with its use. FIG. 6c shows the alternate potential path which uses 1+1 link 606b. The alternate potential path which uses 1+1 link 606b includes unprotected link 606d, unprotected link 606e, unprotected link 606f, and unprotected link 606g, in addition to 1+1 link 606b. Although such an alternate path, like the potential alternate path which does not use 1+1 link 606b, includes five links and is switched five times, the cost associated with such an alternate path is lower than the cost associated with the potential alternate path which does not use 1+1 link 606b since the cost associated with using 1+1 link 606b is relatively low. Hence, the alternate path which uses 1+1 link 606b has a lower associated cost than the potential alternate path which does not use 1+1 link 606b.

Figure 7:
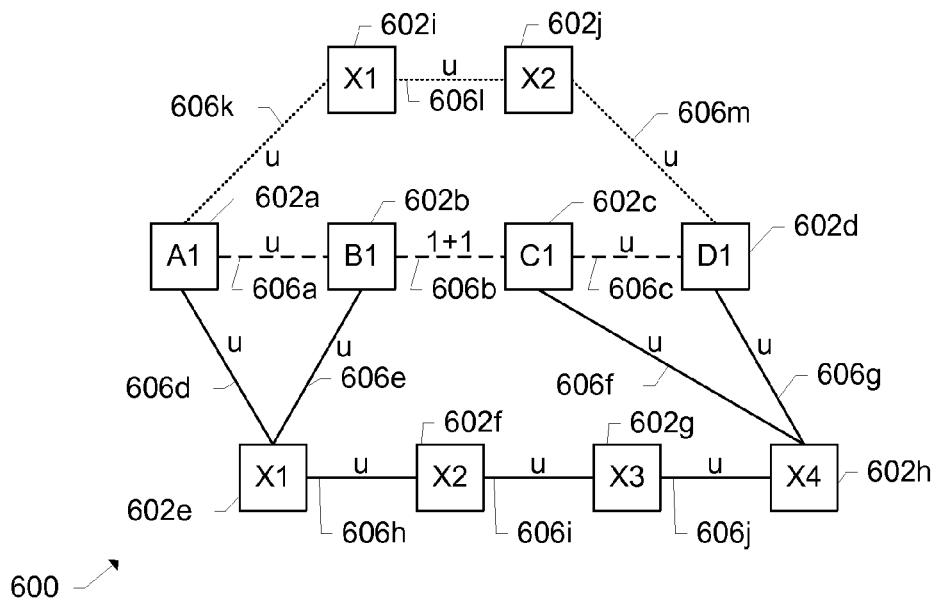
FIG. 7 is a diagrammatic representation of a network which allows a line-protected link to be used in a protected segment and has an alternate path which does not use the line-protected link in accordance with an embodiment of the present invention.

As previously mentioned, although it is generally efficient to effectively reuse line-protected links in alternate paths when the line-protected links have previously been used in a primary path, in some instances, it may be desirable not to reuse such line-protected links. By way of example, when fewer hops are required for an alternate path to be routed between nodes when a line-protected link is not used than when the line-protected link is used, it may be more efficient to use the alternate path which does not use the line-protected link. FIG. 7 is a diagrammatic representation of a network which allows a line-protected link to be used in a protected segment and has an alternate path which does not use the line-protected link in accordance with an embodiment of the present invention. A network 600' includes nodes 602 and links 606. One link 606b has 1+1 protection, while substantially all other links are unprotected links.

A primary path between a source node 602a and a destination node 602d includes unprotected link 606a, 1+1 link 606b, and unprotected link 606c. As discussed above with respect to FIG. 6c, one suitable alternate path which is arranged to protect the primary path includes 1+1 link 606b includes five total links and five hops. Although the costs associated with such a suitable alternate path may be relatively low, when there is an available alternate path which includes fewer hops, i.e., includes fewer links, than an alternate path which includes 1+1 link 606b, such an alternate path may be preferable because fewer total network resources are used.

In the described embodiment, an alternate path between source 602a and destination 602d which protect a primary path that includes 1+1 link 606b may include unprotected links 606k-m. Such an alternate path has fewer hops than an alternate path which would include 1+1 link 606b and, therefore, is generally more efficient to use than an alternate path which would include 1+1 link 606b. Accordingly, within network 600', the optimal overall circuit between source node 602a and destination node 602d may include a primary path which uses links 606a-c and an alternate path which uses links 606k-m.

While a route processor and an overall network may be arranged to enable protected links to be included in path-protected segment, the use of protected links in path-protected segments may be implemented in substantially any overall network, including an overall network that generally is not configured to support the use of protected links in path-protected segments. By way of example, the ability to use a line-protected link in a path-protected segment may be provided to a system in which required nodes may be specified for a path. In such a system, an example of which is described in co-pending U.S. patent application Ser. No. 09/909,049 which has been incorporated by reference, it may be specified that substantially any links may be included in a primary path and, when a line-protected link is included in the primary path, the nodes at the endpoints of the line-protected link may be specified as required nodes in a corresponding alternate path.

Figure 8:
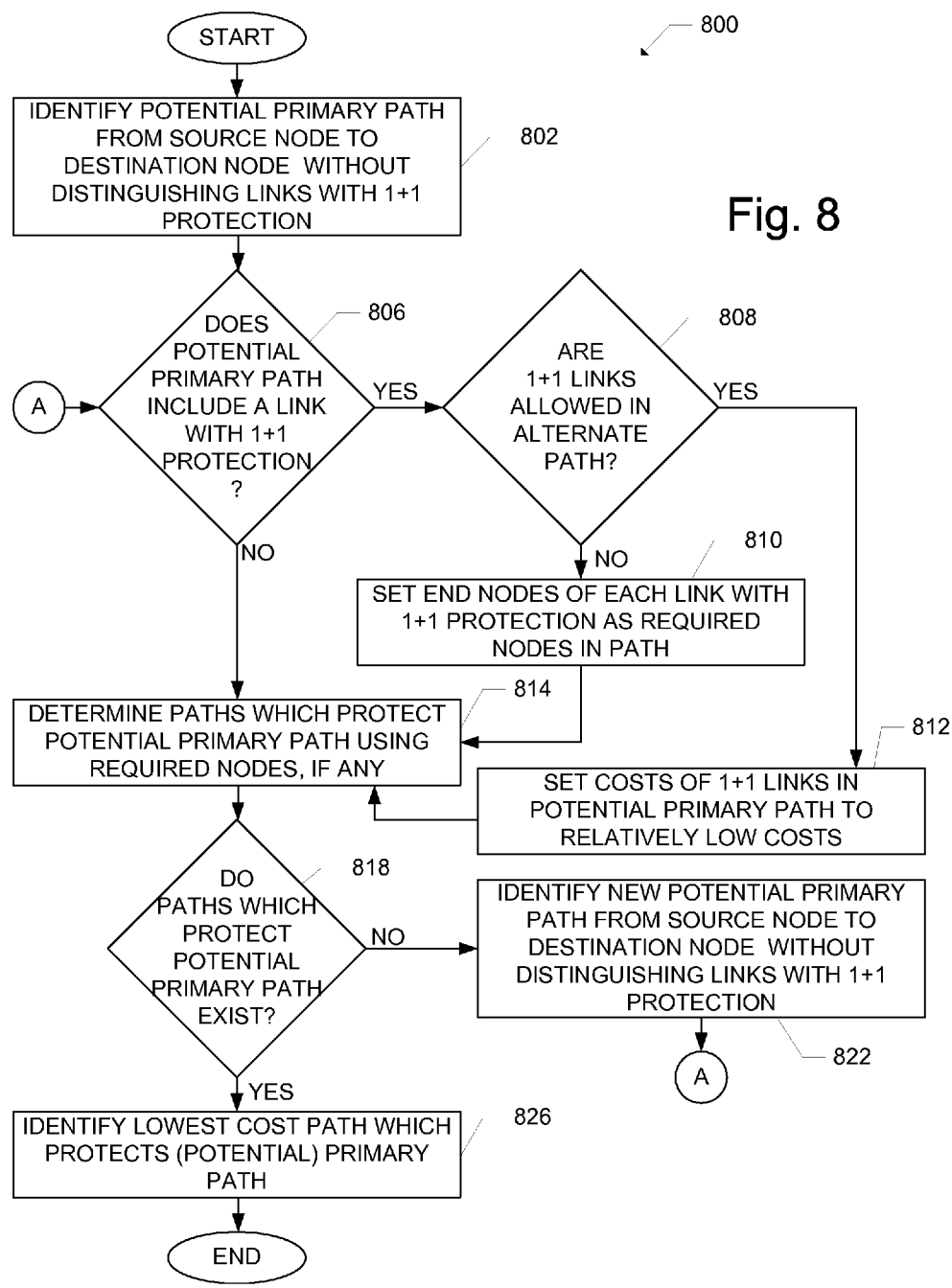
FIG. 8 is a process flow diagram which illustrates the steps associated with one method of using a system in which required nodes may be specified to create an overall circuit which includes line-protected links in a path-protected segment in accordance with an embodiment of the present invention.

FIG. 8 is a process flow diagram which illustrates the steps associated with one method of using a system in which required nodes may be specified to create an overall circuit which includes line-protected links in a path-protected segment in accordance with an embodiment of the present invention. In the described embodiment, when a primary path includes a line-protected link, the alternate path which protects the primary path is generally set to substantially automatically allow the line-protected link to be included if the use of the line-protected link results in a lowest cost path, although it should be appreciated that the ability to include line-protected links in an alternate path is not required. That is, a user may choose whether to enable a system to include line-protected links in an alternate path. A process 800 of creating an overall path begins in step 802 in which a potential primary path from a source node to a destination node is identified substantially without distinguishing links with 1+1 protection. That is, a potential path which is the shortest path available between a source and a destination is identified, and may include both line-protected links and unprotected links.

Once a potential primary path is identified, it is determined in step 806 whether the potential primary path includes any links with 1+1 protection.

If it is determined in step 806 that the potential primary path does not include any links with 1+1 protection, then process flow moves from step 806 to step 814 in which alternate paths which are suitable for protecting a potential primary path are determined using any required nodes. It should be appreciated that a user or a network administrator may provide a list of nodes through which either a primary path or an alternate path of an overall circuit path is to pass. A determination is made in step 818 as to whether any potential alternate paths which protect the potential primary path exist. If it is determined that potential alternate paths which protect the potential primary path exists, then in step 826, a shortest or lowest cost alternate path is selected for use in protecting the current potential primary path. Once the primary path and the alternate path are identified, the process of creating an overall circuit path is completed.

Alternatively, if it is determined in step 818 that no paths which protect the potential primary path exist, then the indication is that the potential primary path is not protectable. Accordingly, in step 822, a new potential primary path from the source node to the destination node is identified substantially without distinguishing links with 1+1 protection. Once a new potential primary path is identified, process flow returns to step 806 in which it is determined if the new potential primary path includes a link with 1+1 protection.

When it is determined in step 806 that the potential primary path includes a links with 1+1 protection, then process flow proceeds to step 808 in which it is determined if 1+1 links are allowed in an alternate path. When a user such as a network administrator has previously decided to allow 1+1 links to be included in alternate paths, then the determination in step 808 may be that 1+1 links are allowed in the alternate path. As such, process flow moves from step 808 to step 812 in which the costs of 1+1 links in the potential primary path are substantially assigned relatively low, e.g., zero, costs. By assigning relatively low costs to such 1+1 links, the likelihood that such 1+1 links are included in an alternate path may be increased. Once costs are assigned to 1+1 links, paths which protected the potential primary path are determined using required nodes, if any, in step 814.

If it is determined in step 808 that 1+1 links are not allowed in the alternate path, then process flow moves to step 810 in which the end nodes of each link with 1+1 protection is set or otherwise identified as required nodes in the alternate path which protects the potential primary path. That is, when a protected link is included in a primary path, the node at which the protected link starts and the node at which the protected link ends may be set as required nodes in a corresponding alternate path. After the end nodes of each link with 1+1 protection are set as required nodes, alternate paths which protect the potential primary path are determined using required nodes in step 814.

Figure 9:
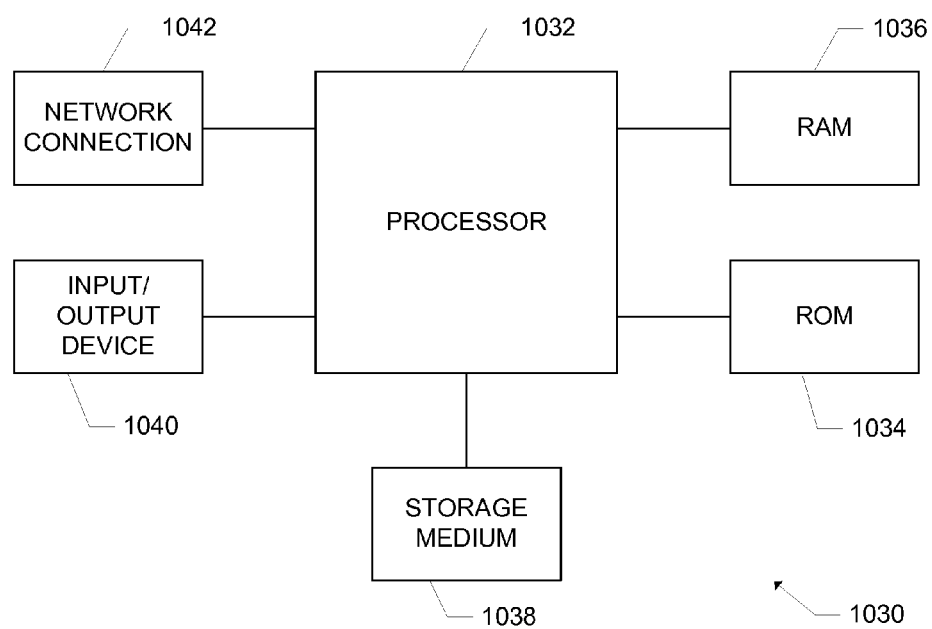
FIG. 9 illustrates a typical, general purpose computing device or computer system suitable for implementing the present invention.

FIG. 9 illustrates a typical, general purpose computing device or computer system suitable for implementing the present invention. A computer system 1030 includes any number of processors 1032 (also referred to as central processing units, or CPUs) that are coupled to memory devices including primary storage devices 1034 (typically a random access memory, or RAM) and primary storage devices 1036 (typically a read only memory, or ROM). ROM acts to transfer data and instructions uni-directionally to the CPU 1032, while RAM is used typically to transfer data and instructions in a bi-directional manner.

CPU 1032 may generally include any number of processors. Both primary storage devices 1034, 1036 may include any suitable computer-readable media. A secondary storage medium 1038, which is typically a mass memory device, is also coupled bi-directionally to CPU 1032 and provides additional data storage capacity. The mass memory device 1038 is a computer-readable medium that may be used to store programs including computer code, data, and the like. Typically, mass memory device 1038 is a storage medium such as a hard disk, a tape, or substantially any suitable medium which is generally slower than primary storage devices 1034, 1036. Mass memory storage device 1038 may take the form of a magnetic or paper tape reader or some other well-known device. It will be appreciated that the information retained within the mass memory device 1038, may, in appropriate cases, be incorporated in standard fashion as part of RAM 1036 as virtual memory. A specific primary storage device 1034 such as a CD-ROM may also pass data uni-directionally to the CPU 1032.

CPU 1032 is also coupled to one or more input/output devices 1040 that may include, but are not limited to, devices such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Input/output devices 1040 may generally include devices which may be used by a network administrator to provide a list of required nodes or links for an overall circuit path. Finally, CPU 1032 optionally may be coupled to a computer or telecommunications network, e.g., a local area network, an internet network or an intranet network, using a network connection as shown generally at 1042. With such a network connection, it is contemplated that the CPU 1032 might receive information from the network, or might output information to the network in the course of performing the above-described method steps. Such information, which is often represented as a sequence of instructions to be executed using CPU 1032, may be received from and outputted to the network, for example, in the form of a computer data signal or code devices embodied in a carrier wave. A route processor module which executes a shortest path algorithm, for example, may generally be implemented using code devices that may be sent and received through network connection 1042 such that the route processor module may exchange information with nodes of a network through network connection 1042. The above-described devices and materials will be familiar to those of skill in the computer hardware and software arts.

Although only a few embodiments of the present invention have been described, it should be understood that the present invention may be embodied in many other specific forms without departing from the spirit or the scope of the present invention. By way of example, an alternate path which is arranged to protect a primary path has been described as including substantially only unprotected links and, in some instances, 1+1 links which were included in the primary path. However, in one embodiment, an alternate path may include a protected link such as a 1+1 link which was not included in the primary path.

While the present invention has been described as being suitable for use with respect to a TDM network that is subject to SONET standards, the present invention is suitable for a variety of different networks. Other suitable networks include, but are not limited to, networks that are subject to a synchronous digital hierarchy (SDH) standard. Further, while the methods of the present invention are suitable for UPSRs, the methods may generally be modified for use with other types of switched ring architectures.

As described above, in one embodiment, when it is desired for a 1+1 link included in a primary path to be included in a corresponding alternate path, the node at the beginning of the 1+1 link and the node at the end of the 1+1 link may be specified as required nodes in the context of the alternate path. It should be appreciated that in lieu of specifying the nodes at the beginning and the end of the 1+1 link as required, the 1+1 link itself may be specified as required.

A device, e.g., a route generator, which is arranged to determine an overall circuit path may be implemented as a part of a computing device as discussed above. Such a device may be in communication with a network on which the overall circuit path is to be implemented. In one embodiment, such a device may be implemented on a source node of the network.

A software algorithm which enables line-protected links to be included in path-protected segments may generally include functionality which enables a network operator or administrator to determine whether to utilize such a feature. In other words, software which allows line-protected links to be included in path-protected segments may effectively be configured to provide an option of whether to enable or to disable the option of including line-protected links in path-protected segments. For example, if hardware of a network does not support the inclusion of line-protected links in path-protected segments, a network operator may choose to disable the option of using line-protected links in path-protected segments in his or her software.

In general, the steps associated with methods of enabling a line-protected link to be included in a path-protected segment may be widely varied. Steps may be added, removed, altered, or reordered without departing from the spirit or the scope of the present invention. For example, steps associated with aborting a process of identifying a an overall circuit path when no potential primary paths which have suitable corresponding alternate paths may be identified. Therefore, the present examples are to be considered as illustrative and not restrictive, and the invention is not to be limited to the details given herein, but may be modified within the scope of the appended claims.

What is claimed is:

1. A system for computing circuit paths between a first node and a second node within a network, the network including a plurality of elements, the system having a processor and at least one computer-readable medium storing computer-executable instructions and comprising:

a first set of computer-executable instructions creating a primary circuit path from the first node to the second node, the primary circuit path including at least one protected link selected from the plurality of elements, wherein the first set of computer-executable instructions is arranged to include the at least one protected link in a protectable segment of the primary circuit path; and a second set of computer-executable instructions creating an alternate circuit path from the first node to the second node, wherein the alternate circuit path is arranged to protect at least the protectable segment of the primary circuit path, wherein the second set of computer executable instructions include:

a first subset of computer-executable instructions assigning a cost to at least one protected link;

a second subset of computer-executable instruction assigning costs associated to each link of a plurality of links included in the plurality of elements, wherein the cost assigned to the at least one protected link is lower than the costs associated with each link of the plurality of links; and a third subset of computer-executable instruction considering costs associated with the plurality of links and the cost associated with the at least one protected link to determine the alternate circuit path.

2. The system as recited in claim 1 wherein the at least one protected link is a link with 1+1 protection.

3. The system as recited in claim 1 wherein the second set of computer-executable instructions is arranged to create the alternate circuit path using the at least one protected link.

4. The system as recited in claim 3 wherein the at least one protected link is a link with 1+1 protection.

5. The system as recited in claim 1 further including a third set of computer-executable instructions which enable at least one element of the plurality of elements which is required in the alternate circuit path to be specified, wherein the second set of computer-executable instructions is arranged to create the alternate circuit path using at least one element of the plurality of elements which is required.

6. The system as recited in claim 5 wherein at least one element of the plurality of elements which is required in the alternate circuit path is a third node which is associated with a beginning of the at least one protected link and a fourth node which is associated with the end of the at least one protected link.

7. The system as recited in claim 1 wherein the system is associated with the first node.

8. The system as recited in claim 1 further including a fourth set of computer-executable instructions arranged to implement the primary circuit path and the alternate circuit path.

9. The system as recited in claim 1 wherein the primary circuit path is a lowest cost circuit path between the first node and the second node and the alternate circuit path is a lowest cost circuit path between the first node and the second node which protects the primary circuit path.

10. A method for computing an overall circuit path within a network, the overall circuit path including a primary path and an alternate path, the primary path being defined from a start node to a destination node, the method comprising:

a processor determining the primary path using a routing algorithm, wherein the primary path includes a protectable segment which has a first line-protected link; and the processor creating the alternate path using the routing algorithm, wherein creating the alternate path includes creating the alternate path from the start node to the end node, the alternate path arranged to protect at least the protectable segment which includes the first line-protected link;

wherein the primary path is the lowest cost path between the start node and the destination node, and wherein creating the alternate path using the routing algorithm includes considering costs associated with a plurality of links associated with the network and a cost associated with the first line-protected link, the cost associated with the first line-protected link being lower than the costs associated with the plurality of links.

11. The method of claim 10 wherein the protectable segment is a path protected segment that includes the first line-protected link and the alternate path is arranged to protect the path-protected segment.

12. The method of claim 10 wherein creating the alternate path using the routing algorithm further includes creating the alternate path with the alternate path including the first line-protected link.

13. The method of claim 12 further including:

specifying that a first node associated with the start of the first line-protected link and a second node associated with the end of the first line-protected link are included in the alternate path.

14. The method of claim 10 wherein the primary path is the shortest path between the start node and the destination node.

15. The method of claim 10 wherein the overall circuit path is a unidirectional path-switched ring.

16. A method for computing an overall circuit path within a network, the overall circuit path including a primary path segment and an alternate path segment, the primary path segment being defined from a start node to a destination node, the method comprising;

a processor determining the primary path segment to include at least one line-protected link between the start node and the destination node;

the processor determining the alternate path segment to start at the start node and end at the destination node, wherein the alternate path segment is arranged to protect the primary path segment that includes the at least one line-protected link;

the processor assigning a cost to the at least one line-protected link;

the processor assigning costs associated to each link of a plurality of links included in a plurality of elements in the primary path, wherein the cost assigned to the at least one line-protected link is lower than the costs associated with each link of the plurality of links; and the processor considering costs associated with the plurality of links and the cost associated with the at least one line-protected link to create the alternate path.

17. The method of claim 16 wherein the alternate path segment includes the at least one line-protected link.

18. The method of claim 16 wherein the overall circuit path is a unidirectional path-switched ring.

19. The method of claim 16 wherein the at least one line protected link is arranged between a first node and a second node, and wherein the alternate path segment is not switched through the first node or the second node.

20. The method of claim 16 wherein the primary path segment is a lowest cost path segment between the start node and the destination node.

21. A system for computing an overall circuit path within a network, the overall circuit path including a primary path segment and an alternate path segment, the primary path segment being defined from a start node to a destination node, the system having a processor and at least one computer-readable medium storing computer-executable instructions and comprising;

a first set of computer-executable instructions determining the primary path segment to include at least one line-protected link from the start node to the destination node;

and a second set of computer-executable instructions determining the alternate path segment to start at the start node and end at the destination node, wherein the alternate path segment is arranged to protect the primary path segment that includes the at least one line protected link, wherein the second set of computer executable instructions include:

a first subset of computer-executable instructions assigning a cost to at least one line-protected link;

a second subset of computer-executable instruction assigning costs associated to each link of a plurality of links, wherein the cost assigned to the at least one line-protected link is lower than the costs associated with each link of the plurality of links; and a third subset of computer-executable instruction considering costs associated with the plurality of links and the cost associated with the at least one line-protected link to determine the alternate path segment.

22. The system of claim 21 wherein the alternate path segment includes the at least one line-protected link.

23. The system of claim 21 wherein the overall circuit path is a unidirectional path-switched ring.

24. The system of claim 21 wherein the at least one line-protected link is arranged between a first node and a second node, and wherein the alternate path segment is not switched through the first node or the second node.

25. A system for computing circuit paths from a first node to a second node within a network, the network including a plurality of elements, the system including a processor and at least one computer-readable medium storing computer-executable instructions and comprising:

a first set of computer-executable instructions arranged to enable a determination to be made regarding whether at least one protected link selected from the plurality of elements may be included in a protectable segment of a primary circuit path;

a second set of computer-executable instructions arranged to create a primary circuit path from the first node to the second node which includes at least one protected link when it is determined to include at least one protected link in the protectable segment of the primary path, wherein the second set of computer-executable instructions is arranged to include the at least one protected link in the protectable segment of the primary circuit path;

a third set of computer-executable instructions arranged to create an alternate circuit path from the first node to the second node when it is determined to include the at least one protected link in the protectable segment of the primary path, wherein the alternate circuit path is arranged to protect at least the protectable segment of the primary circuit path;

a fourth set of computer-executable instructions arranged to create a primary circuit path between the first node and the second node which does not include at least one protected link when it is determined that at least one protected link may not be included in the protectable segment of the primary path; and a fifth set of computer-executable instructions arranged to create an alternate circuit path between the first node and the second node, wherein the alternate circuit path is arranged to protect the primary circuit path.

26. The system as recited in claim 25 wherein the at least one protected link is a link with 1+1 protection.

27. The system as recited in claim 25 wherein the third set of computer-executable instructions is arranged to create the alternate circuit path using the at least one protected link.

* * * * *